(12) United States Patent
Samuel et al.

(10) Patent No.: US 7,085,642 B2
(45) Date of Patent: Aug. 1, 2006

(54) METHOD AND SYSTEM FOR CORRECTING SENSOR OFFSETS

(75) Inventors: Stephen Varghese Samuel, Detroit, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 10/617,278

(22) Filed: Jul. 10, 2003

(65) Prior Publication Data

US 2004/0030474 A1   Feb. 12, 2004

Related U.S. Application Data

(60) Provisional application No. 60/401,417, filed on Aug. 5, 2002.

(51) Int. Cl.
*G06F 7/00* (2006.01)
*B60G 17/017* (2006.01)

(52) U.S. Cl. ............................. 701/82; 701/36; 180/170

(58) Field of Classification Search ................ 701/82, 701/36, 93, 38, 5, 70; 180/170, 282; 702/104, 702/85, 142, 96, 87, 88, 89; 340/440
See application file for complete search history.

(56) References Cited

U.S. PATENT DOCUMENTS

| | | |
|---|---|---|
| 2,917,126 A | 12/1959 | Phillips |
| 3,604,273 A | 9/1971 | Kwok et al. |
| 3,608,925 A | 9/1971 | Murphy |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,597,462 A | 7/1986 | Sano et al. |
| 4,650,212 A | 3/1987 | Yoshimura |
| 4,679,808 A | 7/1987 | Ito et al. |
| 4,690,553 A | 9/1987 | Fukamizu et al. |
| 4,761,022 A | 8/1988 | Ohashi |
| 4,765,649 A | 8/1988 | Ikemoto et al. |
| 4,767,588 A | 8/1988 | Ito |

(Continued)

FOREIGN PATENT DOCUMENTS

DE   36 16 907   11/1987

(Continued)

OTHER PUBLICATIONS

A method for reducing on-road rollovers—anti—rollover braking, Thomas J. Wielenga, Dynamotive, LLC, International Congress and Exposition, Detroit, Michigan, Mar. 1-4, 1999.

(Continued)

*Primary Examiner*—Dalena Tran
(74) *Attorney, Agent, or Firm*—Artz & Artz, P.C.; Fredrick Owens

(57) ABSTRACT

A control system (18) for an automotive vehicle (19) having a vehicle body includes a cluster (16) of vehicle dynamic sensors (27, 28, 30, 31), the output signals from the sensors (Yaw Rate Sensor, Roll Rate Sensor, Longitudinal Acceleration Sensor, Lateral Acceleration Sensor) are corrected for errors by removing the zero output DC bias. Such bias constitutes an error that may occur as a result of temperature changes, manufacturing defects, or other factors. The system (18) also compensates for the drift in the sensor output signals that occur during vehicle operation.

22 Claims, 2 Drawing Sheets

U.S. PATENT DOCUMENTS

| | | |
|---|---|---|
| 4,778,773 A | 10/1988 | Sukegawa |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,274,576 A | 12/1993 | Williams |
| 5,278,761 A | 1/1994 | Ander et al. |
| 5,282,134 A | 1/1994 | Gioutsos et al. |
| 5,307,274 A | 4/1994 | Takata et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A * | 8/1995 | Pastor et al. .................... 701/1 |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,719,790 A * | 2/1998 | Lohrenz et al. ............. 702/104 |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A * | 3/2000 | Schiffmann .................... 701/1 |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,233,510 B1 | 5/2001 | Platner et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 * | 11/2001 | Madau et al. .................. 700/89 |
| 6,315,373 B1 | 11/2001 | Yamada et al. |
| 6,321,141 B1 | 11/2001 | Leimbach |
| 6,324,445 B1 | 11/2001 | Tozu et al. |
| 6,324,446 B1 | 11/2001 | Brown et al. |
| 6,324,458 B1 | 11/2001 | Takagi et al. |
| 6,330,522 B1 | 12/2001 | Takeuchi |

| | | | |
|---|---|---|---|
| 6,332,104 B1 | 12/2001 | Brown et al. | |
| 6,338,012 B1 | 1/2002 | Brown et al. | |
| 6,349,247 B1 | 2/2002 | Schramm et al. | |
| 6,351,694 B1 | 2/2002 | Tseng et al. | |
| 6,352,318 B1 | 3/2002 | Hosomi et al. | |
| 6,356,188 B1 | 3/2002 | Meyers et al. | |
| 6,360,147 B1 * | 3/2002 | Lee | 701/35 |
| 6,363,309 B1 | 3/2002 | Irie et al. | |
| 6,366,833 B1 * | 4/2002 | Fukuyama | 701/1 |
| 6,370,938 B1 | 4/2002 | Leimbach et al. | |
| 6,394,240 B1 | 5/2002 | Barwick | |
| 6,397,127 B1 | 5/2002 | Meyers et al. | |
| 6,419,240 B1 | 7/2002 | Burdock et al. | |
| 6,428,118 B1 | 8/2002 | Blosch | |
| 6,438,464 B1 | 8/2002 | Woywod et al. | |
| 6,477,480 B1 | 11/2002 | Tseng et al. | |
| 6,496,758 B1 | 12/2002 | Rhode et al. | |
| 6,496,763 B1 | 12/2002 | Griessbach | |
| 6,498,976 B1 | 12/2002 | Ehlbeck et al. | |
| 6,547,022 B1 | 4/2003 | Hosomi et al. | |
| 6,554,293 B1 | 4/2003 | Fennel et al. | |
| 6,556,908 B1 | 4/2003 | Lu et al. | |
| 6,559,634 B1 | 5/2003 | Yamada | |
| 6,600,985 B1 * | 7/2003 | Weaver et al. | 701/45 |
| 6,704,631 B1 * | 3/2004 | Winner et al. | 701/34 |
| 6,718,279 B1 * | 4/2004 | Bustgens et al. | 702/151 |
| 6,810,311 B1 * | 10/2004 | Winner et al. | 701/29 |
| 2002/0014799 A1 | 2/2002 | Nagae | |
| 2002/0040268 A1 | 4/2002 | Yamada et al. | |
| 2002/0056582 A1 | 5/2002 | Chubb | |
| 2002/0075139 A1 | 6/2002 | Yamamoto et al. | |
| 2002/0082749 A1 | 6/2002 | Meyers et al. | |
| 2002/0096003 A1 | 7/2002 | Yamada et al. | |
| 2002/0139599 A1 | 10/2002 | Lu | |
| 2003/0040856 A1 | 2/2003 | Winner et al. | |
| 2003/0109939 A1 * | 6/2003 | Burgdorf et al. | 700/38 |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |
| WO | WO 02/20318 A1 | 3/2002 |

OTHER PUBLICATIONS

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Saftey Vehicles, Goteborg, Sweden, May 29-Jun. 1, 1989.

Niji, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

* cited by examiner

_US 7,085,642 B2_

METHOD AND SYSTEM FOR CORRECTING SENSOR OFFSETS

RELATED APPLICATIONS

The present invention claims priority to provisional application No. 60/401,417 filed on Aug. 5, 2002.

TECHNICAL FIELD

The present invention relates generally to a dynamic behavior control apparatus for an automotive vehicle, and more specifically, to a method and apparatus for correcting offsets in vehicle dynamic sensors.

BACKGROUND

Dynamic control systems for automotive vehicles have recently begun to be offered on various products. Typical dynamic control systems include sensors corresponding to various vehicle dynamics. Examples thereof include: a yaw rate sensor, a roll rate sensor, a longitudinal acceleration sensor, and a lateral acceleration sensor. Typical dynamic control systems also include a controller that receives the sensor signals and controls various safety and stability systems in response thereto.

During various different phases of vehicle operation, the aforementioned sensors tend to generate errors that may result in false signals received in the controller.

It would therefore be desirable to provide a correction or compensation system and method. The new system should not require additional sensors and should also not require shutting-down dynamic control sensors. The present invention is directed to these ends.

SUMMARY OF THE INVENTION

It is therefore an object of the invention to provide a system for correcting for offsets within vehicle dynamic sensors.

In one aspect of the invention, a sensor offset correction method for a vehicle includes generating a first offset correction signal for a vehicle dynamic sensor at a sensor power-up, generating a second offset correction signal for the vehicle dynamic sensor when the vehicle is moving, and correcting the vehicle dynamic sensor in response to the first offset correction signal and the second offset correction signal.

In a further aspect of the invention, a control system for an automotive vehicle having a vehicle body includes a cluster of vehicle dynamic sensors positioned within the vehicle body adapted to generate a plurality of vehicle dynamic signals.

The system may further include a controller adapted to receive the plurality of vehicle dynamic signals, generate a first offset correction signal for one of the cluster of the vehicle dynamic sensors in response to a DC bias and at a sensor power-up, generate a second offset correction signal for the one of the cluster of the vehicle dynamic sensors in response to a signal equivalent to a temperature drift signal and when the vehicle is moving, generate a third offset correction signal for the one of the cluster of the vehicle dynamic sensors when the vehicle is at rest and the one of the cluster of the vehicle dynamic sensors is below an accuracy threshold, and correct the one of the cluster of the vehicle dynamic sensors in response to the first offset correction signal, the second offset correction signal and the third offset correction signal.

One advantage of the invention is that readings from vehicle dynamic sensors are more accurate.

Other objects and features of the present invention will become apparent when viewed in light of the detailed description of the preferred embodiment when taken in conjunction with the attached drawings and appended claims.

DETAILED DESCRIPTION OF THE PRESENT INVENTION

Figure 1:
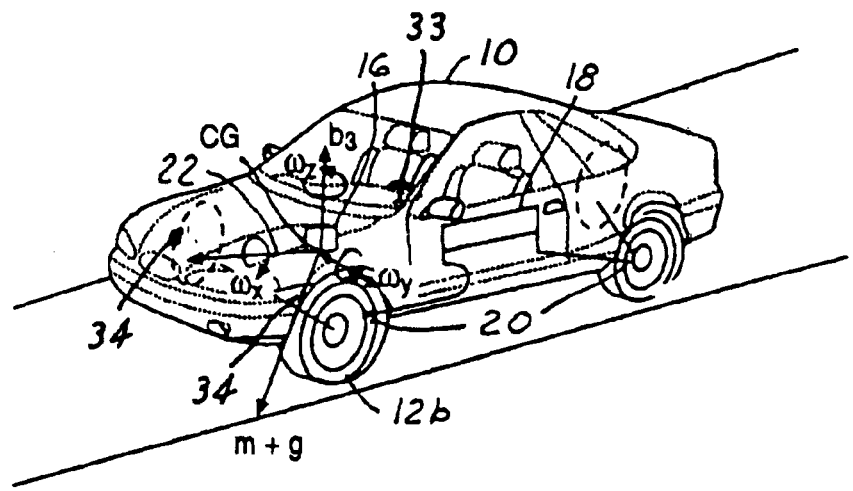
FIG. 1 is a diagrammatic view of a vehicle with variable vectors and coordinator frames in accordance with one embodiment of the present invention.

In the following figures the same reference numerals are used to identify the same components.

Figure 2:
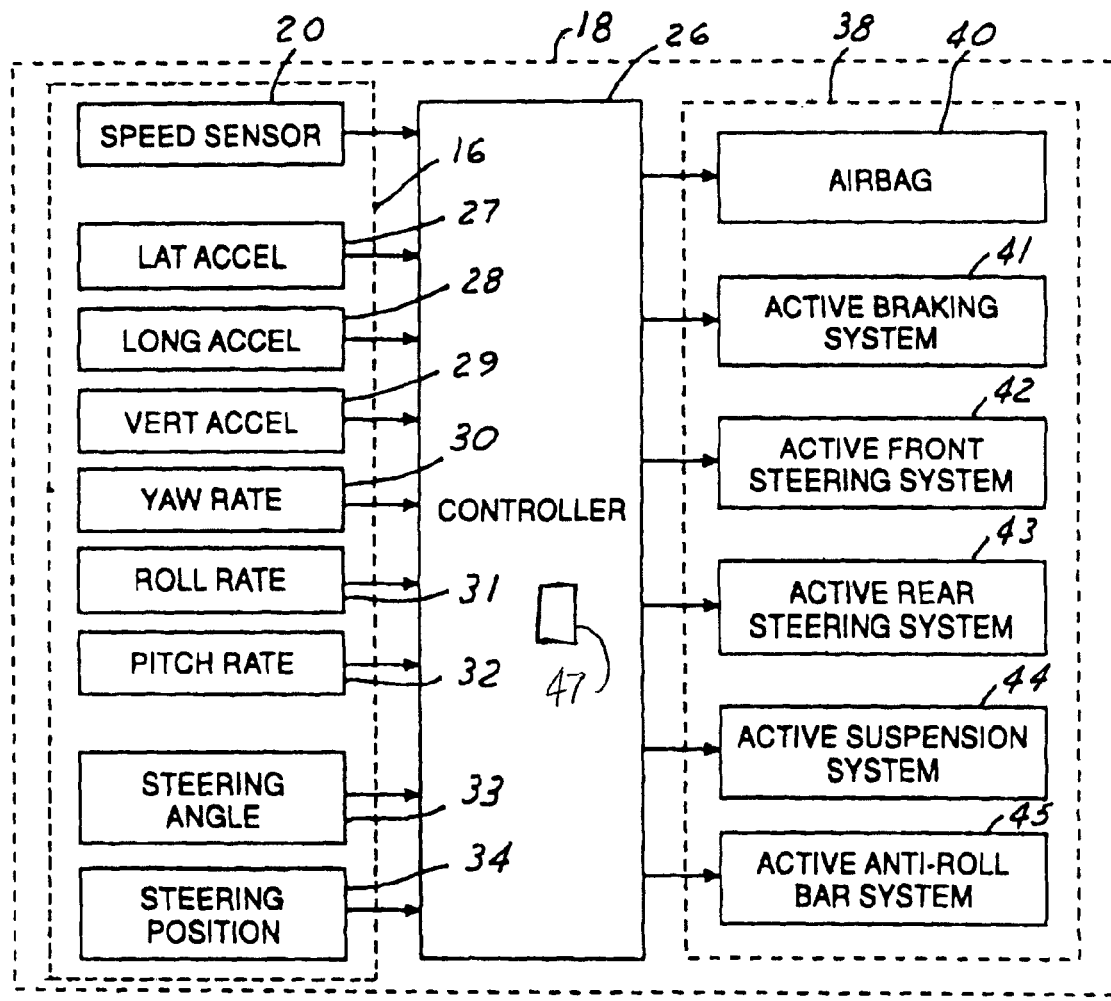
FIG. 2 is a block diagram of the vehicle sensor system from FIG. 1.

Referring to FIGS. 1 and 2, a control system 18 for an automotive vehicle 19 having a sensing system 16 (sensor cluster) and a controller 26, is illustrated. Various forces and moments are acting thereon during a rollover condition.

The vehicle control system 18 includes the sensor system 16. The sensing system 16 may use a six control sensor set including three axial accelerometers including a lateral accelerometer 27 (generating a lateral acceleration signal), a longitudinal accelerometer 28 (generating a longitudinal acceleration signal), and a vertical accelerometer 29 (generating a vertical acceleration signal) and three axial rotation rate detectors including a yaw rate sensor 30 (generating a yaw rate signal), a roll rate sensor 31 (generating a roll rate signal), and a pitch rate sensor 32 (generating a pitch signal). Of course, those skilled in the art will recognize that one or more sensors may not be included in the system 18.

The sensor system 16 further includes various other sensors, such as wheel speed sensors 20, a steering angle sensor 33 (hand-wheel sensor), and steering angle position sensors 34 (road-wheel sensors). As one skilled in the art will understand, the various sensors generate a plurality of vehicle dynamic signals. These are further described below.

The vehicle control system 18 may also include the controller 26. The controller 26 receives the plurality of vehicle dynamic signals and generates a first offset correction signal for one of the cluster 16 of the vehicle dynamic sensors (27, 28, 30, or 31) in response to a DC bias and at a sensor power-up. The controller 26 also generates a second offset correction signal for the one of the cluster 16 of the vehicle dynamic sensors (27, 28, 30, or 31) in response to a signal equivalent to a temperature drift signal and when the vehicle 19 is moving. The controller 26 further generates a third offset correction signal for the one of the cluster 16 of the vehicle dynamic sensors (27, 28, 30, or 31) when the vehicle 19 is at rest and the sensor is below an accuracy threshold. The controller 26 still further corrects the vehicle dynamic sensing system 16 in response to the first offset correction signal, the second offset correction signal and the third offset correction signal.

Based upon inputs from the sensor system 16, the controller 26 may control a safety device 38. Depending on the desired sensitivity of the system and various other factors, not all the sensors are used in a commercial embodiment. The safety device 38 may control an airbag 40 or a steering actuator or braking actuator at one or more of the wheels of the vehicle 19. Also, other vehicle components such as a suspension control 48 are used to adjust the suspension to prevent rollover. Suspension control 48 may include an anti-roll bar.

In this system 18, the output signals from the RSC sensors (Yaw Rate Sensor 30, Roll Rate Sensor 31, Longitudinal Acceleration Sensor 28, Lateral Acceleration Sensor 27) are corrected for errors by removing the zero output DC bias. Such bias constitutes an error that may occur as a result of temperature changes, manufacturing defects, or other factors. This system 18 also compensates for the drift in the sensor output signals that can occur during vehicle operation.

In one embodiment, to reduce run time, calculations of the offset variables are not performed during Anti-Lock Brake (ABS), Active Yaw Control (AYC), Traction Control System (TCS), or Roll Stability Control (RSC) events. Runtime for the system 18 is highest during these events. The signals, however, are filtered and compensated during this time. Calculations of offset variables are also paused when the flag is set (one example of logic therefore includes: RSC_SENSORS_DISTURBED). This flag is set externally when the sensors are undergoing a self-test, the sensor values are too high, or the rate of change is higher than expected.

An example of logic therefore includes: If (ABS_CYCLE || AYC_CYCLE || RSC_CYCLE || TCS-CYCLE); (In generic terms, if ABS, AYC, TCS or RSC are active then the following logic runs.)

{offset_comp( )}; (This function compensates and filters out the signals from sensor.)

else {if(!SENSORS_DISTURBED) {offset_initializaton ( ); (This function initializes the offset values.)

if (VEHICLE_STANDSTILL) (offset_resting( ); (When the vehicle 19 is standing still, this function is called.)

else {offset_signals( );} (When the vehicle 19 is moving, this function is called.)

{offset-comp( )} (This function compensates and filters out the signals from sensors.)

One example of offset compensation external inputs to the aforementioned logic includes:

| RSC Code Name | Logic Description Name |
| --- | --- |
| 1. Get_abs_cycle | ABS_CYCLE |
| 2. Get_ayc_in_cycle | AYC_CYCLE |
| 3. st_ROLL_FLAG.bf_bool_ACTIVE_ROLL_CONTROL | RSC_CYCLE |
| 4. Get_tcs_engine_control_active | TCS_CYCLE |
| 5. RSC_SENSOR_BITS.RSC_SENSORS_DISTURBED | RSC_SENSORS_DISTURBED |
| 6. ss_mps_REF_VELOCITY_YC | VEHICLE_SPEED |
| 7. Get_vehicle_standstill | VEHICLE_STANDSTILL |

There are three phases of operation occurring within the controller 26: 1) Initialization, normally occurring at electric power-on of the vehicle 19; 2) Resting, occurring whenever the vehicle 19 is not in motion; and 3) Dynamic, occurring when the vehicle 19 is in motion.

Figure 3:
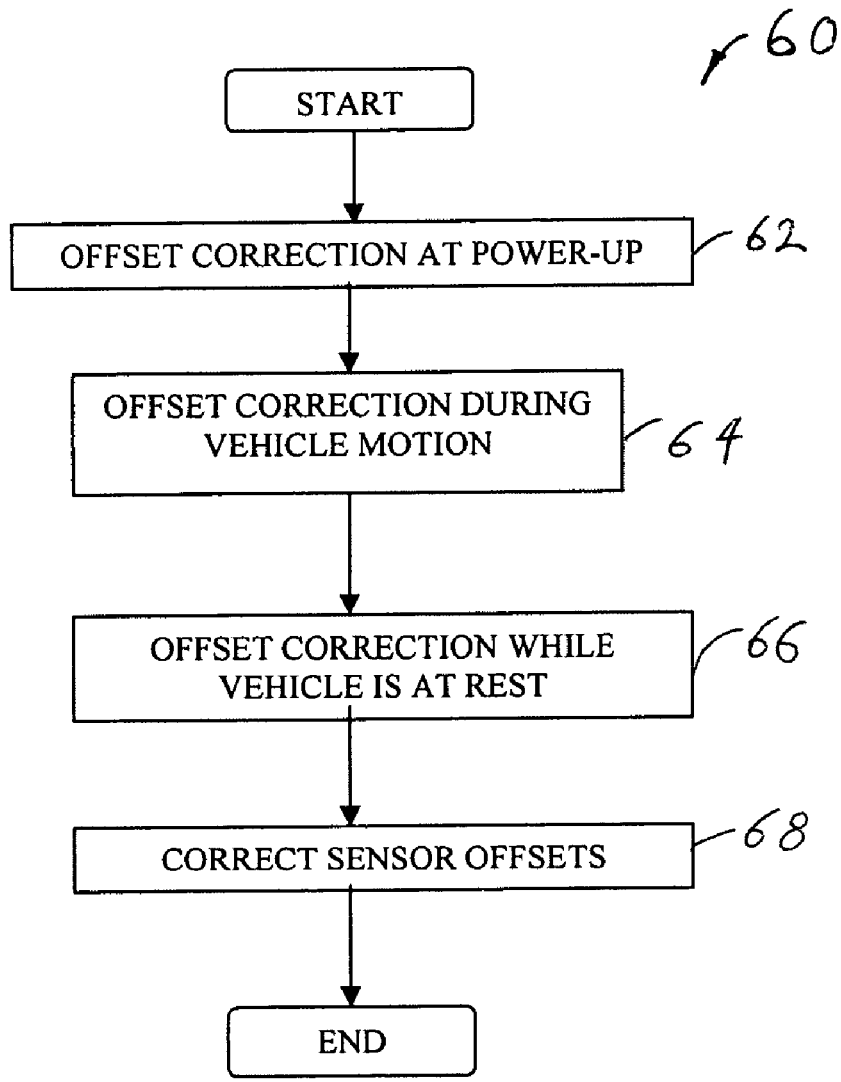
FIG. 3 is a logic flow diagram of a method for compensating for offset errors in vehicle dynamic sensors in accordance with another embodiment of the present invention.

Referring to FIG. 3, a logic flow diagram 60 of a method for compensating for offset errors in vehicle dynamic sensors (27, 28, 30, or 31) is illustrated. Logic starts in operation block 62 where a first offset correction signal or initialization for a vehicle dynamic sensor (27, 28, 30, or 31) is generated at a sensor power-up.

Initialization of Roll Rate or roll rate signal and Yaw Rate or yaw rate signal occurs when the vehicle ignition key is turned on or electrical power is otherwise supplied to the vehicle systems. INITIALIZATION_COMPLETE indicates a flag is set at the end of initialization. Initialization eliminates initial D.C. bias that is present at the initialization.

If the vehicle 19 is standing still when the ignition is turned on, the offsets are computed such that the filtered roll rate and yaw rate is approximately zero deg/sec. Other vehicle movement checks when standing still, such as rolling or turning, are also performed. Initialization continues until the initialization timer reaches, for example, one second. If the vehicle 19 starts moving before initialization is complete, the average of the maximum and minimum offset values (that have been calculated over a long time period, such as the entire operating time of the vehicle 19) are computed and used as the initial offset values.

In one embodiment, the average of the yaw rate and roll rate is limited to between, for example, +−3.5 deg/sec, because the sensor specification defines the +−3.5 deg/sec example as the worst case zero point offset for the rate sensors.

Initialization occurs when the vehicle ignition is turned on, or electrical power is otherwise supplied to the vehicle systems. If the vehicle 19 is standing still when the ignition is turned on, then the offsets are computed such that the filtered Ax (Longitudinal Acceleration) and Ay (Lateral Acceleration) values are approximately equal to the Ax and Ay values that existed and were written to the controller EEPROM 47 (Electrically Erasable Programmable Read-Only Memory) when power was removed from the system 18 at the end of the previous driving cycle.

If the vehicle 19 was not standing still when the previous EEPROM 47 write occurred or an EEPROM 47 write did not occur during the last ignition off, then the offsets is computed by taking the average of the maximum and minimum value. The system assumes that the geographical location of the vehicle 19 has not been changed since the vehicle 19 has been shut off. Also to minimize error if the vehicle 19 has been moved during an ignition off, the Ax and Ay offset calculations are limited to within the boundaries of maximum and minimum values from EEPROM 47.

An example of initialization logic includes:

```
If    ((VehicleStandStill)&&    !(INIT_FLAG  &
INITIALIZATION_COMPLETE){if  ((RollAcceleration  <=
VEHICLE_STAND_STILL_ROLL_ACC)&&
(YawAcceleration   <=
VEHICLE_STAND_STILL_YAW_ACC));
    {if      (!(RSC_SENSORS_DISTURBED))
    {RollRateOffset    +=    FilteredRollRate   /
InitializationTimer;
        YawRateOffset    +=   FilteredYawRate   /
InitializationTimer;
        InitializationTimer ++;}
        If   (InitializationTimer   >=    ONE_SEC_UP)
     {INIT_FLAG |= INITIALIZATION_COMPLETE;}}
    Else
        {InitializationTimer = 0;   /* Restart the
initialization */}}
    else
        {RollRateOffset   =    LIMIT(+−3.5 deg/sec,
    (MAX_RR_OFST_EE + MIN_RR_OFST_EE)/2);
        YawRateOffset   =    LIMIT(+−3.5 deg/sec,
    (MAX_YR_OFST_EE + MIN_YR_OFST_EE)/2);
        INIT_FLAG |= INITIALIZATION_COMPLETE;}
```

For the aforementioned logic, one example of offset initialization external inputs includes:

| RSC Code Name | Logic Description Name |
| --- | --- |
| 8. Get_vehicle_standstill(): A macro to determine if the vehicle is standing still | VehicleStandStill |
| 9. ss_mpss_LONG_ACC: Raw Longitudinal Acceleration | RawAx |
| 10. ss_mpss_LAT_ACC: Raw Lateral Acceleration | RawAy |
| 11. ss_dps_FLT_ROLL_RATE: Filtered and compensated roll rate. | FilteredRollRate |
| 12. ss_dps_FLT_YAW_RATE: Filtered and compensated yaw rate. | FilteredYawRate |
| 13. ROLL_ACCELERATION2: Roll Rate Acceleration. | RollAcceleration |
| 14. YAW_ACCELERATION2: Yaw Rate Acceleration. | YawAcceleration |
| 15. RSC_SENSOR_CALIBRATION_VALUES [Rr_ofst_max]: Roll rate maximum value from EEPROM (over a long time period, such as total operating time of the vehicle) | MAX_RR_OFFSET_EE |
| 16. RSC_SENSOR_CALIBRATION_VALUES [Rr_ofst_min]: Roll rate minimum value from EEPROM (over a long time period, such as total operating time of the vehicle) | MIN_RR_OFFSET_EE |
| 17. RSC_SENSOR_CALIBRATION_VALUES [Yr_ofst_max]: Yaw rate maximum value from EEPROM (over a long time period, such as total operating time of the vehicle) | MAX_YR_OFFSET_EE |
| 18. RSC_SENSOR_CALIBRATION_VALUES [Yr_ofst_min]: Yaw rate minimum value from EEPROM (over a long time period, such as total operating time of the vehicle) | MIN_YR_OFFSET_EE |
| 19. RSC_SENSOR_CALIBRATION_VALUES [Along_ofst_max]: Longitudinal Acceleration maximum value from EEPROM (over a long time period, such as total operating time of the vehicle) | MAX_AX_OFFSET_EE |
| 20. RSC_SENSOR_CALIBRATION_VALUES [Along_ofst_min]: Longitudinal Acceleration minimum value from EEPROM (over a long time period, such as total operating time of the vehicle) | MIN_AX_OFFSET_EE |
| 21. RSC_SENSOR_CALIBRATION_VALUES [Alat_ofst_max]: Lateral Acceleration maximum value from EEPROM (over a long time period, such as total operating time of the vehicle) | MAX_AY_OFFSET_EE |
| 22. RSC_SENSOR_CALIBRATION_VALUES [Alat_ofst_min]: Lateral Acceleration minimum value from EEPROM (over a long time period, such as total operating time of the vehicle) | MIN_AY_OFFSET_EE |
| 23. RSC_SENSOR_CALIBRATION_VALUES [Long_acc]: Longitudinal Acceleration stored in EEPROM from the previous ignition cycle | AxEE |
| 24. RSC_SENSOR_CALIBRATION_VALUES [Lat_acc]: Lateral Acceleration stored in EEPROM from the previous ignition cycle | AyEE |
| 25. Get_rsc_eeprom_var_bit(VEHICLE_STAND_STILL): A macro to determine from EEPROM if vehicle was standing still last time the EEPROM write was made. | Vehicle_was_standing_still_during_last_ignition_off |

-continued

| RSC Code Name | Logic Description Name |
|---|---|
| 26. Get_rsc_eeprom_var_bit(NO_EEPROM_STORAGE_RSC): A macro to determine from EEPROM if an EEPROM write is made in the last ignition cycle. | An_EEPROM_write_was_made_during_last_ignition_off |

One example of offset initialization outputs include:

| RSC Code Name | Logic Description Name |
|---|---|
| 1. ss_mpss_LAT_ACC_OFFSET | AxOffset |
| 2. ss_mpss_LONG_ACC_OFFSET | AyOffset |
| 3. ss_mpss_ROLL_RATE_OFFSET | RollRateOffset |
| 4. ss_mpss_YAW_RATE_OFFSET | YawRateOffset |
| 5. ss_mpss_ROLL_RATE_OFFSET_INIT: The initial value of roll rate offset. | InitialRollRateOffset |
| 6. ss_mpss_YAW_RATE_INIT: The initial value of filtered and compensated yaw rate. | InitialYawRate |
| 7. Clr_rsc_eeprom_var_bit(NO_EEPROM_STORAGE_LAST_CYCLE): A macro that clears the specified bit in shadow EEPROM. | |
| 8. bf_uc_INITIALIZATION_STATUS: Flags set during initialization | INITIALIZATION_COMPLETE |

Offset initialization parameters include: rr_ofst_eep_max, which is the maximum limit that the roll rate offset can be; yr_ofst_eep_max, which is the maximum limit that the yaw rate offset can be; along_ofst_eep_max, which is the maximum limit that the longitudinal acceleration offset can be; alat_ofst_eep_max, which is the maximum limit that the lateral acceleration offset can be.

One example of offset initialization state variables includes: bf_uc_initialization_status, which is an initialization flag for checking initialization condition status, and ss_tim_initialization_timer, which sets a start time for the initialization timer.

In one embodiment of the present invention, if the vehicle 19 starts moving before the initialization completes, a flag is set, and an initial value of the Ax and Ay offsets is computed by taking the maximum and minimum offsets values from EEPROM 47. When the initial value is calculated by taking the average of the maximum and the minimum value, it is always limited to, for example, +−1.5 m/sec^2 for the acceleration sensors, because the acceleration sensors should not experience the worst case zero point offset of greater than, for example, 0.11 g. An example of logic therefore includes:

```
If ((VehicleStandStill)
   &&!(INIT_FLAG & INITIALIZATION_COMPLETE)
   &&(Vehicle_was_standing_still_during_last_ignitio
n_off)&&(An_EEPROM_write_was_made_during_last_ignition
_off))
   {if((RollAcceleration<=VEHICLE_STAND_STILL_ROLL_A
CC)
   &&    (YawAcceleration    <=
VEHICLE_STAND_STILL_YAW_ACC))
   {if (!(RSC_SENSORS_DISTURBED))
   {AxOffset += (RawAx − AxEE) * LOOP_TIME_SEC;
   AyOffset += (RawAy − AyEE) * LOOP_TIME_SEC;
   AxOffset = max (MIN_AX_OFST_EE, AxOffset);
```

-continued

```
   AxOffset = min (MAX_AX_OFST_EE, AxOffset);
   AyOffset = max (MIN_AY_OFST_EE, AyOffset);
   AyOffset = min (MAX_AY_OFST_EE, AyOffset);
   InitializationTimer ++;}
   If (InitializationTimer >= ONE_SEC_UP)
{INIT_FLAG |= INITIALIZATION_COMPLETE;}}; an initial
value of the Ax and Ay offsets is computed by taking
the maximum and minimum offsets values from EEPROM 47.
   else
   {InitializationTimer = 0;  /* Restart  the
initialization */}}
   else{AxOffset   =   LIMIT(+−
1.5 m/sec^2, (MAX_AX_OFST_EE + MIN_AX_OFST_EE )/2);
limits the Ax offset max and min to 1.5 m/sec^2.
   AyOffset = LIMIT(+−1.5 m/sec^2, (MAX_AY_OFST_EE +
MIN_AY_OFST_EE)/2); limits the Ay offset max and min
to 1.5 m/sec^2.
   INIT_FLAG |= INITIALIZATION_COMPLETE;}
```

In operation block 64, a second offset correction signal is generated for the vehicle dynamic sensor (27, 28, 30, or 31) when the vehicle 19 is moving. The second offset signal deals with moving conditions of the vehicle. Embodiments thereof are discussed below.

If the vehicle 19 is turning continuously for a given time period (15 seconds is used in this example) in one direction, offset compensation may be paused for yaw rate, roll rate, and Ay. If the vehicle 19 is turning continuously to the right hand side, a negative turn flag is set and if it is turning to the left hand side, a positive turning flag is set. Logic to illustrate this includes:

```
If  ((FltYawRate  <  0  &&  SWA  <  RIGHT_TURN)
{POS_TURNING_COUNTER −= 2;
NEG_TURNING_COUNTER ++;
POS_TURNING_COUTNER = min (POS_TURNING_COUNTER,
MAX_COUNT_VALUE);
NEG_TURNING_COUNTER = max (NEG_TURNING_
COUNTER,
MIN_COUNT_VALUE);
   If (TURNING_TIME < NEG_TURNING_COUNTER)
SET_SUSTAINED_NEG_TURNING_15SEC;
   Else
   {If (POS_TURNING_COUNTER <= TURNING_TIME)
CLEAR_SUSTAINED_POS_TURNING_15SEC;
CLEAR_SUSTAINED_NEG_TURNING_15SEC;}}
   If ((FltYawRate > 0 && SWA > LEFT_TURN)
{NEG_TURNING_COUNTER −= 2;
POS_TURNING_COUNTER ++;
NEG_TURNING_COUTNER = min (NEG_TURNING_COUNTER,
MAX_COUNT_VALUE);
POS_TURNING_COUNTER = max (POS_TURNING_COUNTER,
MIN_COUNT_VALUE);
   If (TURNING_TIME < POS_TURNING_COUNTER)
SET_SUSTAINED_POS_TURNING_15SEC;
   Else{If(NEG_TURNING_COUNTER<= TURNING_TIME)
CLEAR_SUSTAINED_NEG_TURNING_15SEC;
CLEAR_SUSTAINED_POS_TURNING_15SEC;}}
```

To clarify the aforementioned logic, an example of dynamic offset external inputs includes:
An example of dynamic offset variables includes:

| RSC Code Name | Logic Description Name |
|---|---|
| 1. Get_vehicle_standstill() | |
| 2. bf_uc_INITIALIZATION_STATUS | |
| 3. ss_deg_STEERING_WHEEL_ANGLE | |
| 4. Get_ayc_reverse_det_possible() | |
| 5. ss_dps_FLT_YAW_RATE | FltYawRate |
| 6. ss_deg_PITCH_ANGLE_ESTIMATE | PitchAngleEst |
| 7. ss_deg_PITCH_OFFSET_ESTIMATE | PitchOffset |
| 8. ss_deg_REL_PITCH_ANGLE | PitchRelative |

An example of dynamic offset outputs includes:

| RSC Code Name | Logic Description Name |
|---|---|
| 1. ss_dps_ROLL_RATE_OFFSET | RollRateOffset |
| 2. ss_dps_YAW_RATE_OFFSET | YawRateOffset |
| 3. ss_dps_LONG_ACC_OFFSET | AxOffset |
| 4. ss_dps_LAT_ACC_OFFSET | AyOffset |

One embodiment of dynamic offset parameters includes: TURNING_TIME; MAX_COUNT_VALUE; MIN_COUNT_VALUE; Rr_ofst_eep_max; Yr_ofst_eep_max; Alat_ofst_eep_max; Along_ofst_eep_max; and p_LOOP_TIME_SEC.

Under most normal driving circumstances, the average yaw rate and the average roll rate should be close to zero over a long period of time. Any time a non-zero value is detected for the yaw rate and/or roll rate, they are compensated for continuously by a very small amount, which is equal to the maximum temperature drift rate for the signal.

Over a long period of time, the average road bank angle is considered to be zero. Any time a non-zero value is detected, lateral acceleration offset is adjusted in the controller 26 such that lateral acceleration will drive road bank angle to zero.

Over a long period of time, the average road pitch angle is considered to be zero. Any time a non-zero value is detected, longitudinal acceleration offset is adjusted in the controller 26 such that longitudinal acceleration will drive pitch angle to zero. Road pitch angle is calculated by taking the current pitch angle estimate and then subtracting the relative pitch angle and the pitch angle offset. Logic to illustrate this includes:

RoadPitchEst=PitchAngleEst−PitchOffset−PitchRelative;

```
If (RoadPitchEst > 0) AxOffset −=
MAX_AX_DRIFT_RATE;
  Else if (RoadPitchEst < 0)
  AxOffset += MAX_AX_DRIFT_RATE;
  If (!(GET_SUSTAINED_POS_TURNING_15SEC))
  {if (FltYawRate > 0)
  YawRateOffset += MAX_YR_DRIFT_RATE;
  If (!(GET_SUSTAINED_NEG_TURNING_15SEC))
  {if (RollRate > 0)    RollRateOffset +=
MAX_RR_DRIFT_RATE;}
    if (InstBankAngleEstimate < 5 &&
InstBankAngleEstimate > 0)
    AyOffset += MAX_AY_DRIFT_RATE;}
  if (!(GET_SUSTAINED_NEG_TURNING_15SEC))
  {if (FltYawRate < 0)
  YawRateOffset −= MAX_YR_DRIFT_RATE;
  If (!(GET_SUSTAINED_POS_TURNING_15SEC))
  {if (RollRate < 0)
  RollRateOffset −= MAX_RR_DRIFT_RATE;}
    if (InstBankAnbleEstimate > −5 &&
InstBankAngleEstimate < 0)
    AyOffset −= MAX_AY_DRIFT_RATE;
```

In operation block 66, a third offset correction signal is generated for a vehicle dynamic sensor when the vehicle 19 is at rest. Embodiments thereof are included below.

An example of offset resting external inputs includes:

| RSC Code Name | Logic Description Name |
|---|---|
| 1. bf_uc_INITIALIZATION_STATUS: Flag to determine if initialization is completed | INITIALIZATION_COMPLETE |
| 2. ss_dps_ROLL_ACCELERATION2: Roll Acceleration | RollAcceleration |
| 3. ss_dps_YAW_ACCELERATION2: Yaw acceleration | YawAcceleration |

An example of offset resting state variables includes:

| RSC Code Name | Logic Description Name |
|---|---|
| 1. ss_dps_FLT_YR_COMP_REST: Filtered and compensated resting yaw rate | |
| 2. ss_dps_RESTING_YR_OFFSET: Resting slow drifting offset. | RestingYROffset |
| 3. bf_uc_OFFSET_FLAG: Flags that are set during resting | VEHICLE_STOPPED_FOR_ONE_SEC HOLD_RESTING_VALUES |
| 4. ss_mpss_FLT_LONG_ACC_RESTING: Initial resting longitudinal acceleration | |
| 5. ss_mpss_FLT_LAT_ACC_RESTING: Initial resting lateral acceleration | FltAyResting |
| 6. ss_RESTING_UPDATE_CLOCK: Clock | FltAxResting |

An example of offset resting outputs includes:

| RSC Code Name | Logic Description Name |
|---|---|
| 1. CLEAR_SUSTAINED_POS_TURNING_15SEC: Clear the continuous 15 second turn counter | |
| 2. CLEAR_SUSTAINED_NEG_TURNING_15SEC: Clear the continuous 15 second turn counter | |
| 3. ss_dps_YAW_RATE_OFFSET | YawRateOffset |
| 4. ss_dps_ROLL_RATE_OFFSET | RollRateOffset |
| 5. ss_dps_LONG_ACC_OFFSET | AxOffset |
| 6. ss_dps_LAT_ACC_OFFSET | AyOffset |

An example of offset resting parameters includes: 1. Yr_ofst_eep_max; 2. ALLOWED_RESTING_ROLL- _ACC: Acceleration that is allowed when standing still; 3. ALLOWED_RESTING_YAW_ACC: Acceleration that is allowed when standing still.

After the vehicle 19 comes to a complete stop, to ensure that no transient signals (such as may be caused by the vehicle 19 rocking, bouncing, or swaying on its suspension) are received in the controller 26, the controller 26 waits, for example, an additional second. An example of logic thereof includes:

```
If ((INIT_FLAG & INITIALIZATION_COMPLETE)
&& (!(RSC_SENSORS_DISTURBED)))
{if ( !( OFFSET_FLAG &
VEHICLE_STOPPED_FOR_ONE_SEC)
{RESTING_UPDATE_CLOCK ++;
If (RESTING_UPDATE_CLOCK >= ONE_SEC_UP)
OFFSET_FLAG|= VEHICLE_STOPPED_FOR_ONE_SEC}}
```

An average value for filtered lateral acceleration (Ax) and longitudinal acceleration (Ay) for a period of 1 second is generated after the vehicle 19 has come to a stop. These values are used to compute the Ax and Ay offsets during standing still. Any drifts in Ax and Ay are considered to be due to sensor drifts and is compensated for by applying the appropriate offset. An example of logic and inputs therefore follow.

One example of filtering and compensation external inputs includes:

| RSC Code Name | Logic Description Name |
| --- | --- |
| 1. Get_vehicle_standstill() | |
| 2. bf_uc_INITIALIZATION_STATUS | |
| 3. ss_dps_YAW_RATE | RawYawRate |
| 4. ss_dps_ROLL_RATE | RawRollRate |
| 5. ss_mpss_LONG_ACC | RawAx |
| 6. ss_mpss_LAT_ACC | RawAy |
| 7. ss_mpss_YAW_RATE_OFFSET | YawRateOffset |
| 8. ss_mpss_ROLL_RATE_OFFSET | RollRateOffset |
| 9. ss_mpss_LONG_ACC_OFFSET | AxOffset |
| 10. ss_mpss_LAT_ACC_OFFSET | AyOffset |
| 11. ss_dps_FLT_ROLL_RATE | FltRollRate |
| 12. ss_dps_FLT_YAW_RATE | FltYawRate |
| 13. ss_mpss_FLT_LONG_ACC | FltAx |
| 14. ss_mpss_FLT_LAT_ACC | FltAy |

One example of filtering and compensation state variables includes:

| RSC Code Name | Logic Description Name |
| --- | --- |
| 1. uc_LONG_TERM_COMP_UPDATE_CLOCK | |
| 2. ss_dps_YR_COMP_UNFLT | RawYawRate |
| 3. ss_dps_RR_COMP_UNFLT | RawRollRate |
| 4. ss_dps_AX_COMP_UNFLT | RawAx |
| 5. ss_dps_AY_COMP_UNFLT | RawAy |
| 6. uc_RR_POS_CNTR | RR_POS_CNTR |
| 7. uc_RR_NEG_CNTR | RR_NEG_CNTR |
| 8. uc_YR_POS_CNTR | YR_POS_CNTR |
| 9. uc_YR_NEG_CNTR | YR_NEG_CNTR |
| 10. uc_AX_POS_CNTR | AX_POS_CNTR |
| 11. uc_AX_NEG_CNTR | AX_NEG_CNTR |
| 12. uc_AY_POS_CNTR | AY_POS_CNTR |
| 13. uc_AY_NEG_CNTR | AY_NEG_CNTR |

One example of filtering and compensation outputs includes:

| RSC Code Name | Logic Description Name |
| --- | --- |
| 1. bf_uc_OFFSET_FLAG | |
| 2. ss_dps_FLT_ROLL_RATE | FltRollRate |
| 3. ss_dps_FLT_YAW_RATE | FltYawRate |
| 4. ss_mpss_FLT_LONG_ACC | FltAx |
| 5. ss_mpss_FLT_LAT_ACC | FltAy |

One example of filtering and compensation parameters includes: RR_MAX_LOOP; RR_DECR_CNTR; YR_MAX_LOOP; YR_DECR_CNTR; AX_MAX_LOOP; AX_DECR_CNTR; AY_MAX_LOOP; and AY_DECR_CNTR.

Filtering and compensation logic includes the computed values of the offsets taken out from the raw value before they are filtered. Therefore: RawRollRate-=RollRateOffset; RawYawRate-=YawRateOffset; RawAx-=AxOffset; and RawAy-=AyOffset.

An embodiment of logic for generating offsets during standing still includes:

```
if ((OFFSET_FLAG & VEHICLE_STOPPED_FOR_ONE_SEC)
&& ! (OFFSET_FLAG & HOLD_RESTING_VALUES))
{FltAxResting = ((FltAxResting * TempCounter) +
FltAx) / (TempCounter + 1);
FltAyResting = ((FltAyResting * TempCounter) +
FltAy) / (TempCounter + 1);
TempCounter ++;
If (TempCounter >= ONE_SEC_UP)
OFFSET_FLAG |= HOLD_RESTING_VALUES;}
```

If any vehicle rolling motions or change in yaw is picked up when stopped, VEHICLE_STOPPED_FOR_ONE_SEC and HOLD_RESTING_VALUES flags is unset. Resting Ax and Ay values (step 2) is re-computed after this. Logic therefore includes:

```
If (INIT_FLAG & INITIALIZATION_COMPLETE)
{if (( RollAcceleration <=
VEHICLE_STAND_STILL_ROLL_ACC)
&& (YawAcceleration <=
VEHICLE_STAND_STILL_YAW_ACC))
{OFFSET_FLAG &= ~VEHICLE_STOPPED_FOR_ONE_SEC
OFFSET_FLAG &= ~HOLD_RESTING_VALUES;}}
```

Any changes in lateral acceleration and longitudinal acceleration are assumed to be due to sensor drifts when the vehicle 19 is at a standstill. Logic to illustrate this includes:

```
If ((VEHICLE_STOPPED_FOR_ONE_SEC)
&& (HOLD_RESTING_VALUES)
&& (ROLL_ACCELERATION < ALLOWED_RESTING_ROLL_ACC)
&& (YAW_ACCELERATION < ALLOWED_RESTING_YAW_ACC))
{if (FltAx > FltAxResting)
FltAxOffset += MAX_AX_DRIFT_RATE;
Else if (FltAx < FltAxResting)
FltAxOffset -= MAX_AX_DRIFT_RATE;
if (FltAy > FltAyResting)
FltAyOffset += MAX_AY_DRIFT_RATE;
```

```
Else if (FltAy < FltAyResting)
FltAyOffset -= MAX_AY_DRIFT_RATE;}
```

During a vehicle standstill, offset compensation is performed within the controller 26 such that the filtered roll and yaw rate is zero. Logic to illustrate this includes:

```
If (VEHICLE_STOPPED_FOR_ONE_SEC)
{Temp    =  RESTING_TIME_CONSTANT   /  LOOP_TIME;
RollRateOffset  += FltRollRate  *  Temp;
YawRateOffset += FltYawRate * Temp;}
```

If the vehicle 19 is turned while standing still, like when the vehicle 19 is stopped/parked on a turntable of a parking facility (referred to as a turntable event), the offset compensation is held constant until the turning is completed by calculating a resting yaw rate compensation value while the vehicle 19 is standing still. No fast compensation is performed while the vehicle 19 is standing still for the resting yaw rate. If this value exceeds a threshold, offset compensation is paused until it is below the threshold. Logic to illustrate this includes:

```
FltYRRest  =  FLTR_COEFF  *  FltYRRest  +  (1  -
FLTR_COEFF)*(RawYawRate - RestingYROffset;
If (FltrYRRest > 0)
RestingYROffset += MAX_YR_DRIFT_RATE;
Else if (FltrYRRest < 0)
RestingYROffset -= MAX_YR_DRIFT_RATE;
If (FltrYRRest > MAX_REST_YR)
{OFFSET_FLAG  &=  ~  VEHICLE_STOPPED_FOR_
ONE_SEC;
OFFSET_FLAG &= ~ HOLD_RESTING_  VALUES;}
```

If an initialization has taken place during a turn table type event, it is corrected when the vehicle 19 is standing still after initialization. In such event, the offsets value is reset to the average of the maximum and the minimum values from EEPROM 47. In such cases, the rate sensors (27, 28, 30, or 31) are limited to, for example, +−3.5 deg/sec and the acceleration sensors is limited to, for example, +−1.5 m/sec^2. The controller 26 achieves this by taking the initial value of the yaw rate after the completion of offset initialization and FltYRRest. Logic to illustrate this includes:

```
If (INTIALIZATION_JUST_FINISHED)
{if (FltYRInitial > FltYRRest + 2)
|| (FltYRInitial < FltYRRest - 2)
{RollRateOffset   =  LIMIT(+-3.5,(MAX_RR_OFST_EE  +
MIN_RR_OFST_EE )/2);
YawRateOffset   =  LIMIT(+-3.5,(MAX_YR_OFST_EE  +
MIN_YR_OFST_EE)/2);
AxOffset    =   LIMIT(+-1.5,(MAX_AX_OFST_EE   +
MIN_AX_OFST_EE )/2);
AyOffset    =   LIMIT(+-1.5,(MAX_AY_OFST_EE   +
MIN_AY_OFST_EE)/2);}}
```

In operation block 68, the vehicle dynamic sensor (27, 28, 30, or 31) is corrected in response to the first offset correction signal, the second offset correction signal, and the third offset correction signal.

In other words, the computed values of the offsets are taken out from the raw sensor value before the sensors (27, 28, 30, or 31) are filtered. Logic to illustrate this includes:
    RawRollRate-=RollRateOffset;
    RawYawRate-=YawRateOffset;
    RawAx-=AxOffset;
    RawAy-=AyOffset;

The roll rate sensor 31 is filtered by limiting the roll rate velocity to a maximum of RR_xxx_CNTR * RR_DELTA. These values are established by taking the worst-case conditions (the maximum roll rate) from data. The slope is continually increased by increasing the counter. The counter is limited the RR_MAX_LOOP value. So, the maximum rate change experienced by the roll rate sensor 31 is RR_MAX_LOOP * RR_DELTA. Logic to illustrate this includes:

```
if (RawRollRate > FltRollRate)
{if (RR_POS_CNTR < RR_MAX_LOOP) RR_POS_CNTR  ++;
if (RR_NEG_CNTR >= RR_DECR_CNTR) RR_NEG_
CNTR  -=
RR_DECR_CNTR;
else RR_NEG_CNTR = 0;
FltRollRate += RR_POS_CNTR * RR_DELTA;
If (RawRollRate < FltRollRate) FltRollRate =
RawRollRate; }
else {if (RR_NEG_CNTR < RR_MAX_LOOP) RR_NEG_CNTR
++;
if (RR_POS_CNTR >= RR_DECR_CNTR) RR_POS_CNTR -=
RR_DECR_CNTR;
else RR_POS_CNTR = 0;
FltRollRate -= RR_NEG_CNTR * RR_DELTA;
If (RawRollRate > FltRollRate) FltRollRate =
RawRollRate;}
```

The same logic is applied to filter Yaw Rate:

```
if (RawYawRate > FltYawRate)
{if (YR_POS_CNTR < YR_MAX_LOOP) YR_POS_CNTR ++;
if (YR_NEG_CNTR >= YR_DECR_CNTR) YR_NEG_CNTR -=
YR_DECR_CNTR;
else YR_NEG_CNTR = 0;
FltYawRate += YR_POS_CNTR * YR_DELTA;
If  (RawYawRate   <  FltYawRate)   FltYawRate   =
RawYawRate;}
else{if  (YR_NEG_CNTR   <  YR_MAX_LOOP)   YR_NEG_
CNTR
++;
if  (YR_POS_CNTR   >=   YR_DECR_CNTR)   YR_POS_
CNTR -=
YR_DECR_CNTR;
else YR_POS_CNTR = 0;
FltYawRate -= YR_NEG_CNTR * YR_DELTA;
If (RawYawRate   >  FltYawRate)   FltYawRate   =
RawYawRate;}
```

The same logic is applied to filter Longitudinal Acceleration:

```
if (RawAx > FltAx)
{if (AX_POS_CNTR < AX_MAX_LOOP) AX_POS_CNTR ++;
if (AX_NEG_CNTR >= AX_DECR_CNTR) AX_NEG_CNTR -=
AX_DECR_CNTR;
else AX_NEG_CNTR = 0;
FltAx += AX_POS_CNTR * AX_DELTA;
If (RawAx < FltAx) FltAx = RawAx;}
else {if (AX_NEG_CNTR < AX_MAX_LOOP) AX_NEG_CNTR
++;
```

-continued

```
if (AX_POS_CNTR >= AX_DECR_CNTR) AX_POS_CNTR -=
AX_DECR_CNTR;
  else AX_POS_CNTR = 0;
FltAx -= AX_NEG_CNTR * AX_DELTA;
If (RawAx > FltAx) FltAx = RawAx;}
```

The same logic is applied to filter Lateral Acceleration:

```
if (RawAy > FltAy)
{if (AY_POS_CNTR < AY_MAX_LOOP) AY_POS_CNTR ++;
  if (AY_NEG_CNTR >= AY_DECR_CNTR) AY_NEG_CNTR -=
AY_DECR_CNTR;
  else AY_NEG_CNTR = 0;
FltAy += AY_POS_CNTR * AY_DELTA;
If (RawAy < FltAy) FltAy = RawAy;}
Else
{if (AY_NEG_CNTR < AY_MAX_LOOP) AY_NEG_CNTR ++;
  if (AY_POS_CNTR >= AY_DECR_CNTR) AY_POS_CNTR -=
AY_DECR_CNTR;
  else AY_POS_CNTR = 0;
FltAy -= AY_NEG_CNTR * AY_DELTA;
If (RawAy > FltAy) FltAy = RawAy;}
```

While particular embodiments of the invention have been shown and described, numerous variations and alternate embodiments will occur to those skilled in the art. Accordingly, it is intended that the invention be limited only in terms of the appended claims.

What is claimed is:

1. A sensor offset correction method for a vehicle comprising;
generating a first offset correction signal for a vehicle dynamic sensor at a sensor power-up, and in response to the vehicle moving prior to completion of power-up, averaging a maximum and a minimum of offset values acquired during vehicle operation and using said average of said maximum and said minimum as said first offset correction signal;
generating a second offset correction signal for said vehicle dynamic sensor when the vehicle is moving; and
correcting said vehicle dynamic sensor in response to at least one of said first offset correction signal and said second offset correction signal.

2. A method as in claim 1 further comprising:
generating a third offset correction signal for said vehicle dynamic sensor when the vehicle is at rest; and
correcting said vehicle dynamic sensor in response to said third offset correction signal.

3. A method as in claim 2 further comprising:
stopping the vehicle; and
delaying generating said third offset correction signal thereby reducing influence of transient signals on said third offset correction signal.

4. A method as in claim 3, wherein generating said third offset correction signal further comprises:
generating said third offset correction signal in response to said vehicle dynamic sensor indicating a change in lateral acceleration or longitudinal acceleration.

5. A method as in claim 3 further comprising;
delaying generating said third offset correction signal until vehicle turning has ceased.

6. A method as in claim 3 further comprising:
compensating for an initialization occurring during a vehicle turn table event when the vehicle is standing still following said initialization.

7. A method as in claim 1, wherein correcting said vehicle dynamic sensor further comprises:
generating a filtered roll rate of zero; and
generating a filtered yaw rate of zero.

8. A method as in claim 1, wherein generating said second offset correction signal further comprises:
pausing offset compensation in response to continuous vehicle turning for a specified time.

9. A method as in claim 1, wherein generating said second offset correction signal further comprises:
detecting a non-zero roll rate value signal;
compensating for said roll rate value signal continuously by an amount substantially equal to a maximum temperature drift rate of said roll rate value signal;
detecting a non-zero yaw rate value signal;
compensating for said yaw rate value signal continuously by an amount substantially equal to a maximum temperature drift rate of said roll rate value signal.

10. A method as in claim 1, wherein generating said second offset correction signal further comprises;
detecting a non-zero value for a road bank angle signal;
adjusting a lateral acceleration offset, such that lateral acceleration drives said road bank angle signal to zero.

11. A method as in claim 1, wherein generating said second offset correction signal further comprises:
detecting a non-zero value for a average road pitch angle signal; and
adjusting a longitudinal acceleration offset, such that lateral acceleration drives said road bank angle signal to zero.

12. A method as in claim 1, wherein generating said first offset correction signal for said vehicle dynamic sensor further comprises:
pausing an offset correction when an RSC sensor disturbance flag is set or during events from at least one of ABS, AYC, TCS, or RSC.

13. A method as in claim 1, wherein generating said first offset correction signal for said vehicle dynamic sensor further comprises:
initializing said sensor; and
substantially eliminating D.C. bias present at initialization of said sensor.

14. A method as in claim 1, wherein generating said first offset correction signal for said vehicle dynamic sensor further comprises:
generating said first offset correction signal such that a resultant filtered roll rate is approximately zero;
generating said first offset correction signal such that a resultant filtered yaw rate is approximately zero.

15. A method as in claim 1, wherein generating said first offset correction signal further comprises:
in response to the vehicle moving prior to completion of initialization, averaging offset values previously acquired and using them as said first offset correction signal.

16. A method as in claim 1, wherein generating said first offset correction signal further comprises:
generating said first offset approximately equal to a previously stored sensor signal from a previous driving cycle.

17. A method as recited in claim 1 further comprising compensating for a valid signal bias in said vehicle dynamic sensor.

18. A method as recited in claim 17, wherein compensating for said valid signal bias further comprises adjusting an electrical long term bias over time with a minute adjustment at each sampling time or a sliding mode control.

19. A sensor offset correction method as in claim 1 further comprising:
generating a third offset correction signal for said vehicle dynamic sensor when the vehicle is at rest and said vehicle dynamic sensor is below an accuracy threshold; and
correcting said vehicle dynamic sensor in response to said first offset correction signal, said second offset correction signal and said third offset correction signal.

20. A sensor offset correction method for a vehicle comprising:
generating a first offset correction signal for a vehicle dynamic sensor at a sensor power-up in response to a DC bias;
generating a temperature drift signal for said sensor;
generating a second offset correction signal for said vehicle dynamic sensor when the vehicle is moving in response to said temperature drift signal;
generating a third offset correction signal for said vehicle dynamic sensor when the vehicle is at rest and said vehicle dynamic sensor is below an accuracy threshold;
correcting said vehicle dynamic sensor in response to said first offset correction signal, said second offset correction signal and said third offset correction signal;
generating said third offset correction signal in response to said vehicle dynamic sensor indicating a change in lateral acceleration or longitudinal acceleration;
delaying generating said third offset correction signal until vehicle turning has ceased;
compensating for an initialization occurring during a vehicle turn table event when the vehicle is standing still following said initialization; and
pausing offset compensation in response to continuous vehicle turning for a specified time;
detecting a non-zero roll rate value signal;
compensating for said roll rate value signal continuously by an amount substantially equal to a maximum temperature drift rate of said roll rate value signal;
detecting a non-zero yaw rate value signal;
detecting a non-zero value for a road bank angle signal;
adjusting a lateral acceleration offset, such that lateral acceleration drives said road bank angle signal to zero;
detecting a non-zero value for a average road pitch angle signal; and
adjusting a longitudinal acceleration offset, such that lateral acceleration drives said road bank angle signal to zero.

21. A method as in claim 20, wherein generating said first offset correction signal for said vehicle dynamic sensor further comprises:
pausing an offset correction when an RSC sensor disturbance flag is set or during events from at least one of ABS, AYC, TCS, or RSC;
initializing said sensor;
generating said first offset correction signal such that a filtered roll rate is approximately zero;
generating said first offset correction signal such that a filtered yaw rate is approximately zero;
in response to the vehicle moving prior to completion of initialization, averaging offset values previously acquired and using them as said first offset correction signal; and
generating said first offset approximately equal to a previously stored sensor signal from a previous driving cycle.

22. A control system for an automotive vehicle having a vehicle body comprising:
a cluster of vehicle dynamic sensors positioned within the vehicle body adapted to generate a plurality of vehicle dynamic signals;
and a controller adapted to receive said plurality of vehicle dynamic signals,
said controller further adapted to generate a first offset correction signal for one of said cluster of said vehicle dynamic sensors in response to a DC bias and at a sensor power-up,
said controller further adapted to generate said first offset correction signal such that a filtered roll rate is approximately zero and a filtered yaw rate is approximately zero;
said controller, in response to the vehicle moving prior to completion of initialization, adapted to average offset values previously acquired and use them as said first offset correction signal;
said controller further adapted to generate said first offset approximately equal to a previously stored sensor signal from a previous driving cycle,
said controller further adapted to generate a second offset correction signal for said one of said cluster of said vehicle dynamic sensors in response to a signal equivalent to a temperature drift signal and when the vehicle is moving,
said controller further adapted to generate a third offset correction signal for said one of said cluster of said vehicle dynamic sensors when the vehicle is at rest and said one of said cluster of said vehicle dynamic sensors is below an accuracy threshold,
said controller further adapted to correct said one of said cluster of said vehicle dynamic sensors in response to said first offset correction signal, said second offset correction signal and said third offset correction signal,
said controller further adapted to pause an offset correction when an RSC sensor disturbance flag is set or during events from at least one of ABS, AYC, TCS, or RSC.

* * * * *